United States Patent Office 3,511,240
Patented May 12, 1970

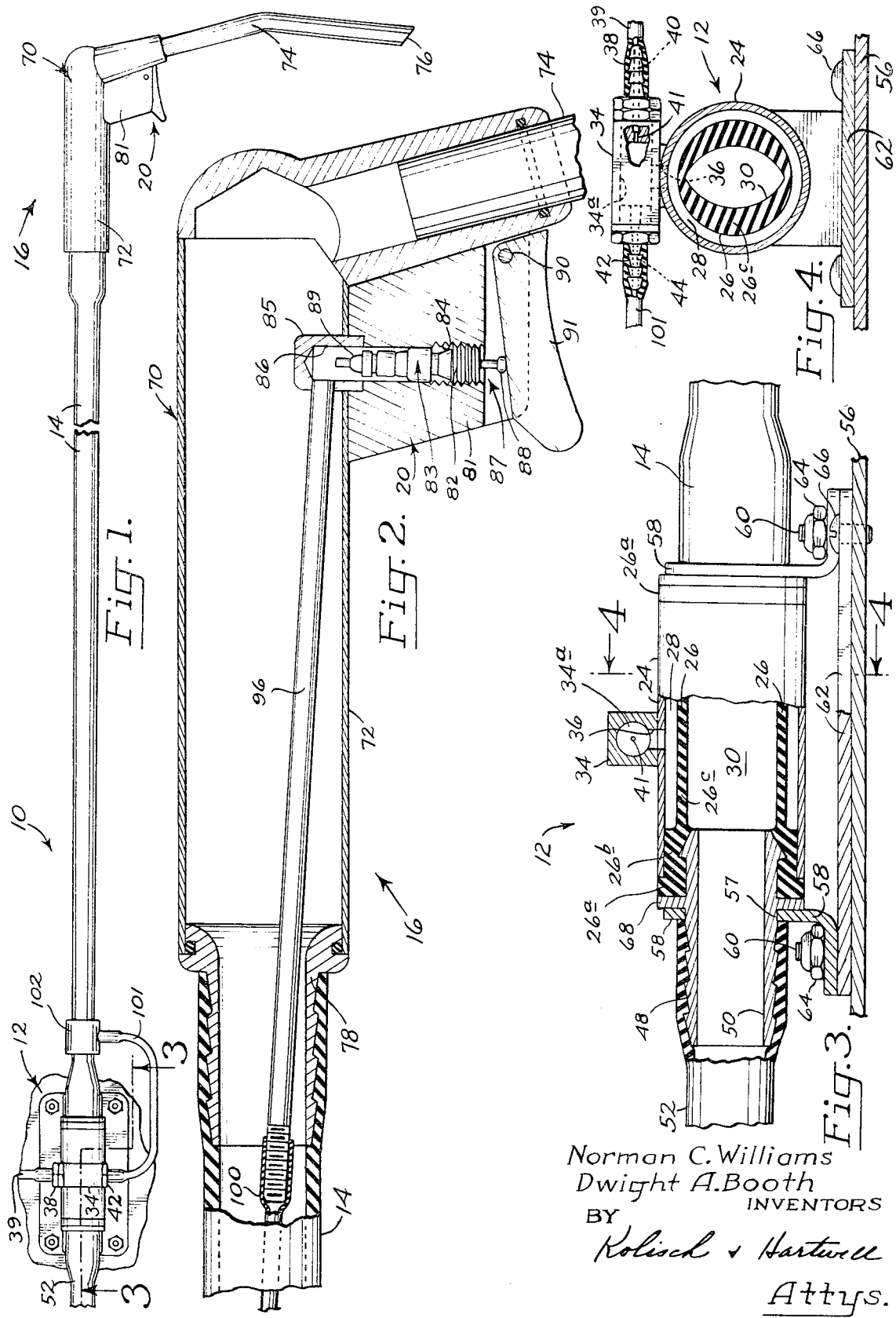

3,511,240
APPARATUS FOR REGULATING FLUID FLOW INCLUDING VALVE AND REMOTE CONTROL
Norman C. Williams, and Dwight A. Booth, Portland, Oreg., assignors to Power Brake Equipment Company, Portland, Oreg., a corporation of Oregon
Filed Aug. 25, 1967, Ser. No. 663,377
Int. Cl. A61c 17/04
U.S. Cl. 128—276       3 Claims

ABSTRACT OF THE DISCLOSURE

Fluid flow regulating apparatus having an elongated conduit through which fluid may flow, a valve with a through-flow passage connected to one end of the conduit and a hollow instrument connected to the other end. The valve has a flexible tubular sleeve, the interior of which bounds the through-flow passage, and a casing which surrounds the sleeve and provides a chamber between the sleeve and the casing to receive pressure fluid. The sleeve collapses laterally to close off the through-flow passage on an introduction of pressure fluid into the chamber. A tube leading from the chamber connects to a pressure release valve mounted on the instrument which is operable to release pressure fluid from the chamber permitting opening of the through-flow passage.

---

This invention relates to fluid flow regulating apparatus. More particularly, it concerns such apparatus which includes a fluid-pressure-operated valve having a through-flow passage which may be closed, an elongated conduit connected at one end to the valve with its interior communicating with the through-flow passage, a hollow instrument connected to the other end of the conduit, and control means mounted on the instrument operable selectively to control the opening of the through-flow passage in the valve.

Such apparatus is useful in applications where it is desired to place a fluid flow-control valve at one point, and an instrument which is connected to and works with fluid which flows through the valve at a point remote from the valve. A specific application of such apparatus is an evacuator, such as is used by a dentist. The evacuator includes a hand-held hollow instrument, open at one point to the atmosphere, which is connected through a conduit to a source of subatmospheric pressure. The instrument is periodically placed in a patient's mouth, with the source of subatmospheric pressure creating a partial vacuum within the instrument which acts to remove fluids and debris from the patient's mouth. As the evacuator is needed only periodically, a valve is required to shut off the flow of fluid when the instrument is not being used.

In the past valves have been used which are mounted on the instrument and which shut off the flow of fluid at the instrument itself. Such a valve creates problems, since it adds to both the size and weight of the instrument, thereby making the instrument unwieldy. Further problems with such former instrument-mounted valves are readily apparent. With such a valve actuated to shut off fluid flow at the instrument, the conduit connecting the instrument to a source of subatmospheric pressure is subjected to collapsing pressures generated by the difference between the subatmospheric pressure within the conduit and normal atmospheric pressures outside the conduit. The walls of a conduit used with such an instrument-mounted valve, therefore, must be constructed of sufficiently heavy and rigid materials to withstand such differences in pressures without collapsing. The heavy, rigid walls of such a conduit add to the unwieldy characteristics of the evacuator, making it difficult to manipulate the instrument.

A general object of the invention is to provide novel apparatus in which a regulable valve for controlling flow of fluid through an instrument is positioned remotely from the instrument and is regulated by control means mounted on the instrument.

A related object is to provide novel apparatus for controlling the flow of fluid through a hand-held instrument, which apparatus allows the instrument to be so constructed as to be manipulated easily.

More specifically, an object is to provide a novel combination featuring a fluid-pressure-operated valve controlling the flow of fluid from another source through a remotely located instrument, and control means on the instrument actuatable by opening up or closing off an exhaust for the pressure fluid operating such valve to control valve actuation.

In certain applications of such apparatus, as in the dental evacuator where cleanliness is important, it is desirable to provide a fluid flow regulating valve which has a substantially straight through-flow passage with a minimum of obstructions to fluid flow projecting into the passage. Another object of the invention, therefore, is to provide a novel fluid flow regulating valve which provides a through-flow passage of this description.

More specifically, an object is to provide a novel fluid flow regulating valve which has a flexible elastomeric sleeve bounding such a through-flow passage in the valve, such sleeve when relaxed providing an open through-flow passage and being laterally collapsible for the purpose of shutting off such passage.

Still more specifically, an object of the invention is the provision of such a valve, having a flexible sleeve bounding a through-flow passage in the valve, where a casing in the valve provides a chamber surrounding the sleeve into which pressure fluid may be introduced to cause collapse of the sleeve and closing of the passage.

A related object is the provision in such a valve of such a flexible sleeve which is constructed to present a through-flow passage having an ovate cross section. With such a shape, on collapse of the sleeve, complete closing is effected with minimal stressing of the walls in the sleeve.

The invention is described in connection with a dental evacuator, but it is not intended by so doing to be limited to a specific field of use. Various other novel features and objects of the invention will become apparent as the following description is read in conjunction with the accompanying drawings, wherein:

FIG. 1 illustrates an evacuator as contemplated, including a fluid-pressure-operated valve, an elongated conduit connected at one end to the valve, and a hollow instrument connected to the opposite end of the conduit;

FIG. 2 is an enlarged view of portions of the instrument shown generally in FIG. 1, with parts broken away better to illustrate internal construction;

FIG. 3 is a view taken along the line 3—3 in FIG. 1, illustrating the fluid-pressure-operated valve on a somewhat enlarged scale;

FIG. 4 is a cross-sectional view of the valve, taken along the line 4—4 in FIG. 3, and drawn to the same scale as FIG. 3.

Referring now to the drawings, and more particularly to FIG. 1, at 10 is indicated generally dental evacuator apparatus constructed in accordance with an embodiment of the invention. In broad terms the apparatus comprises a fluid-pressure-operated valve 12, a flexible elongated conduit 14 connected at one end to valve 12, an instrument 16 connected to the opposite end of conduit 14, and control means 20 mounted on instrument 16 (as is best shown in FIG. 2).

Valve 12, which is illustrated in greater detail in FIGS. 3 and 4, includes an elongated, rigid, tubular casing 24, and a flexible elongated sleeve 26. The sleeve is constructed of elastomeric material and received within the casing.

Valve 12 is substantially symmetrical with respect to a transverse plane bisecting the valve between its ends, and will be described with specific reference to its left end as illustrated in FIG. 3. It will be seen in FIG. 3 that an annular flange 26a is formed at each end of sleeve 26, of somewhat larger diameter than the casing, such flanges being outside of and abutting the ends of the casing. Annular portion 26b of the sleeve disposed longitudinally inwardly of flange 26a has an outer diameter permitting it to fit tightly against the inner surface of the casing. The combination of the flange 26a and portion 26b forms a fluid tight seal between the sleeve and casing.

Central portion 26c of the sleeve has an outer diameter which is smaller than the inner diameter of casing 24. An annular chamber 28, adapted to receive and hold a supply of fluid under pressure, is thus defined between the casing and the outside of the sleeve. As is best seen in FIG. 4, the walls of sleeve portion 26c are not of uniform thickness, and thus through-flow passage 30 of ovate cross section is defined within the sleeve. As a result, when the pressure on the ouside of portion 26c exceeds the pressure on the inside by a sufficient amount, sleeve portion 26c will collapse with the opposed thicker regions of the walls moving toward each other to close off passage 30.

Referring still to FIGS. 3 and 4, mounted on top of casing 24 is a hollow manifold 34 having an internal chamber 34a. Chamber 34a communicates through a bore 36 with chamber 28, thus to provide a passage for the flow of fluid from the manifold to chamber 28.

As is best seen in FIG. 4, a fluid supply nipple 38 joins with one end of manifold 34. This supply nipple is adapted to receive one end of a conduit, such as that illustrated at 39, which is connected at its other end to a source of fluid, such as air under pressure (the source is not shown in the drawings). The supply nipple has a passage 40 extending therethrough which communicates through choke passage 41 with chamber 34a. The choke passage functions to retard the flow of fluid from passage 40 into chamber 34a and chamber 28.

A fluid exhaust nipple 42 is secured to the opposite end of manifold 34 having a passage 44 extending therethrough communicating with chamber 34a. Passage 44 provides a passage through which fluid under pressure may be exhausted from the interior of manifold 34 and from chamber 28.

Referring now to FIG. 3, a nipple 48 is received within each end of sleeve 26 having an outer extremity protruding from the end of the sleeve. Each nipple has a bore 50 extending longitudinally therethrough which communicates at one end with passage 30. A conduit 52 fits over nipple 48 at the left of valve 12 in FIG. 3, and conduit 14 fits over a similar nipple at the right of the valve. In using the apparatus, conduit 52 is connected to a source of a subatmospheric pressure or vacuum (not shown), which vacuum tends to draw material through the valve from conduit 14 to conduit 52.

The valve casing is supported on a base plate 62 by a pair of angle members 58. Each angle member has a hole 57 receiving one of the nipples 48. The angle members have legs which parallel the base plate and are secured to the base plate by stud bolts 60 and nuts 64. Plate 62 is shown screwed to a panel 56 by screws 66.

Referring now to FIGS. 1 and 2, instrument 16, also referred to herein as an evacuator head, has a main body 70 which includes a handle 72 and a neck 74 projecting laterally to one side of the body. Neck 74 is hollow throughout its length, and opens to the atmosphere at its outer end 76. Handle 72 is also hollow throughout its length, and its interior communicates with the inside of the neck. The handle has a nipple 78 joined to one of its ends which receives conduit 14.

Instrument body 70 includes a boss 81 joined to the neck and handle. The casing 82 of a poppet valve assembly 83 is screwed into the threaded portion of a bore 84 extending through boss 81. A cap 85 joined to the inside of handle 72 has an internal chamber 86 receiving the inner extremities of the poppet valve assembly. Spool 87 in the assembly including stem 88 and head 89, when raised relative to the valve casing as shown in FIG. 2 permits the exhaust of air from chamber 86 around the head and through the valve casing. Fluid under pressure such as air in chamber 86 exerts a bias on the valve spool urging it downwardly whereby head 89 seats on the casing to close the valve assembly.

A trigger, or actuator, 91 is pivotally connected adjacent one end to boss 81 at 90, with an inner surface contacting stem 88. A user of the instrument gripping handle 72 in his palm can produce actuation of the poppet valve assembly through digital operation of actuator 91.

An elongated hollow tube 96 joins at one end with cap 85 with its interior communicating with chamber 86. The opposite end of tube 96 receives a flexible conduit 100 fitted thereon. The outer diameters of the tube and conduit 100 are minor as compared to the inner diameter of conduit 14 and handle 72, and thus do not significantly restrict the flow of the fluid through conduit 14. Conduit 100 extends along the interior of conduit 14 to the location of a fitting 102 disposed adjacent fluid-pressure-operated valve 12 (see FIG. 1). The fitting and a conduit 101 are employed in connecting nipple 42 of the manifold 34 with conduit 100.

Pressure fluid in chamber 28 of valve 12 may thus be exhausted to the atmosphere through conduit 100, tube 96 and valve 83 with opening of the poppet valve assembly. This functions, with conduit 39 supplying manifold space 34a connected to a source of fluid under pressure, to decrease the pressure in chamber 28, since choke passage 41 holds the inflow of air or fluid below that which exhausts through conduit 100.

Briefly, describing the operation of the evacuator apparatus illustrated, the apparatus is set up for use by a dentist or an assistant by connecting conduit 52 with a vacuum source and conduit 39 to a source of fluid under pressure such as air. The vacuum that such produces within sleeve 26 is conjunction with the pressure condition which develops around the outside of the sleeve and chamber 28 is effective to cause collapse of the center portion 26c of the sleeve and closing of the ovate passage which is defined through it. When it is desired to evacuate material from a patient's mouth, the neck 74 of the instrument is placed in the mouth and with opening of the poppet valve by pressing of the trigger, a lowering of pressure occurs within chamber 28. When this occurs and because of the resiliency of the elastomer forming sleeve 26, the center section of the sleeve opens up to permit air and other matter to be drawn by vacuum from the instrument and through valve 12 into conduit 52.

The construction of instrument 16 is such that the neck of the instrument may be easily placed in the patient's mouth with the handle arranged in a convenient position to be held in the palm and the trigger readily adapted for finger manipulation. The permanent angle at which the neck extends from the handle in the instrument makes it unnecessary for the person using the instrument to bend sharply conduit 14 in most instances.

With control valve 12 located at a point remote from the instrument, and with this valve being closed for the most part, conduit 14 need not be stiffly constructed in such a manner as to withstand a vacuum without collapse over sustained periods. This permits the use of a lighter and more easily handled conduit making it easier for the instrument to be moved about. Conduit 52 which does confine a vacuum over a sustained period may be made stiff without disadvantage as it is not distorted with use of the instrument.

The valve is easily cleaned which is important in dental equipment. The operating parts are relatively uncomplicated and readily maintained in proper operating condition.

The system of control provided by the invention for valve 12, including the poppet valve assembly and associated trigger mounted on the instrument 16 is susceptible of compact and lightweight construction, further contributing to the ease of manipulation of the instrument.

It is claimed and desired to secure by Letters Patent:

1. Vacuum-operated evacuator apparatus comprising:
    an elongated flexible conduit section for the passage of fluid;
    a valve for controlling fluid flow through said conduit section comprising a flexible sleeve with an internal flow passage which is laterally collapsible upon an external pressure being applied thereagainst to close said passage, and a casing defining a chamber on the outside of said sleeve, said sleeve being connected at one end to one end of the conduit section and the other end of said sleeve being adapted to be connected to a source of subatmospheric pressure;
    a tube connecting said chamber with a source of gas at superatmospheric pressure;
    an evacuator head including a passage opening to the atmosphere connected to the other end of said conduit section with said passage communicating with the interior of said conduit section;
    a control valve on said evacuator head having an open and a closed position, one side of said control valve opening to the atmosphere; and
    a flexible tube interconnecting the other side of said control valve and said chamber, said control valve when open accommodating the exhaust of gas under pressure from said chamber to permit relaxation of said sleeve with opening of said flow passage.

2. The evacuator apparatus of claim 1, wherein the flexible tube interconnecting one side of said control valve and said chamber extends along the interior of said flexible conduit section.

3. The apparatus of claim 1, wherein said evacuator head comprises a body including a handle and a neck projecting laterally of said handle, said passage in said head extends along and inside of said neck and along and inside said handle, said control valve is mounted on said body, and a manually operated actuator is provided for said control valve mounted for movement toward said handle which is operable to open the control valve on movement toward said handle.

References Cited

UNITED STATES PATENTS

| 844,410 | 2/1907 | Schaver | 251—5 XR |
| 2,648,867 | 8/1953 | Erling | 15—319 |

FOREIGN PATENTS

| 1,202,447 | 7/1959 | France. |
| 46,593 | 3/1966 | E. Germany. |
| 278,096 | 1/1952 | Switzerland. |

ALAN COHAN, Primary Examiner

R. GERARD, Assistant Examiner

U.S. Cl. X.R.

251—5; 302—58; 32—33; 15—314, 419